United States Patent [19]

Guido et al.

[11] 4,435,812
[45] Mar. 6, 1984

[54] ELECTRIC FURNACE CONSTRUCTION

[75] Inventors: Heinz Guido, Duisburg; Hubert Wolfgarten, Oberhausen, both of Fed. Rep. of Germany

[73] Assignee: M.A.N. Maschinenfabrik Augsburg-Nürnberg, Fed. Rep. of Germany

[21] Appl. No.: 347,329

[22] Filed: Feb. 9, 1982

[30] Foreign Application Priority Data

Feb. 24, 1981 [DE] Fed. Rep. of Germany ....... 3106741

[51] Int. Cl.³ .............................................. F27D 1/00
[52] U.S. Cl. ................................................... 373/72
[58] Field of Search ...................... 373/72, 36, 37, 38, 373/48, 44, 45, 114

[56] References Cited

U.S. PATENT DOCUMENTS 941,419 11/1909 Keller .................................... 373/72
1,234,947 7/1917 Sperling ................................ 373/72

*Primary Examiner*—Roy N. Envall, Jr.
*Attorney, Agent, or Firm*—McGlew and Tuttle

[57] ABSTRACT

An electric furnace or electric arc or resistance melting furnaces comprises a housing with a refractory lining which defines a furnace hearth in the housing and with a plurality of electrodes extending through the refractory having one of their ends terminating in the hearth and the opposite ends extending out of the housing. A plate is arranged in spaced relationship to the housing on its exterior and is connected to the opposite ends of the electrodes. The plate is arranged to define a cooling space outside of the housing which surrounds the electrodes. A cooling fluid is circulated into the cooling space and over the electrodes.

7 Claims, 2 Drawing Figures

ELECTRIC FURNACE CONSTRUCTION

FIELD AND BACKGROUND OF THE INVENTION

This invention relates in general to the construction of electric furnaces and in particular to a new and useful contact electrode arrangement for electrical arc or resistance melting furnaces.

From German Pat. No. 219575, there is known an electrode arrangement in which the electrodes are designed as a bundle of iron rods which are connected to each other at their lower ends by a plate, thus forming therewith a single body through which the electric current is supplied. This arrangement does not apply the known principle (see German No. OS 25 25 720) of providing an electrically conducting brick lining in the lower part of the furnace, through which the electrode arrangement is supplied. This known solution is disadvantageous particularly in that due to the embedded electrode rods, the brick lining is heated, and thus is subjected to higher stress and wear. A further disadvantage are the uncontrollable contact conditions between the metal rods and the electrically conducting lining, resulting in a poorly controllable current distribution.

SUMMARY OF THE INVENTION

The invention is an improvement over German Pat. No. 219575 of 1910 and is directed to utilizing the concept of providing a metallic base plate to which an electrode arrangement is connected with the effect of obtaining a satisfactory cooling of the electrode necks and of further parts of the furnace, without unfavorably affecting the effeciency, stability and costs.

In accordance with the invention, an electric arc furnace includes a housing which has a refractory which defines a furnace hearth in the housing, a plurality of electrodes extends through the refractory into the hearth. The electrodes have ends which extend out of the housing away from the hearth and terminate in a plate which is spaced away from the housing so as to define a cooling space exteriorly of the housing surrounding the electrodes. The construction includes means for circulating a cooling fluid into the space to cool the electrodes.

Thereby, a chamber is formed between the base plate and the outside of the furnace, through which a fluid is directed to cool the electrode necks and the base plate and, which is still more important, the outside of the furnace. A suitable fluid is primarily air; with extreme stresses, however, liquid sodium may be used as a cooling liquid as well.

This concept has the further advantage that it does not require a current supply from the sides, the supply can be effected in the zone of the axis of the furnace vessel; this axis is defined by the axis of the upper, movable electrode. The axial supply has the advantage that there is substantially no deflection of the arc by the current supply.

To obtain a partly closed space between the base plate and the outside of the furnace, and to be able to circulate the cooling fluid in a closed circuit, it is provided that the base plate is surrounded by a jacket enclosing the space between the outside and the base plate.

In addition, in a particular embodiment, the base plate may be provided with air inlets, for example bores or larger, centrally located slots.

Further provided are air baffles in the intermediate space between the base plate and the furnace outside, by which the air flow, for example, is guided from the inside to the outside. Such baffles may be curved, for example have the shape of sections of archimedean spirals defined by the function $\rho = a \cdot \phi$.

A central current supply advantageously utilizes a tube connection of the central air inlet at the same time for an electrical connection.

The electrode necks may be embedded or fitted in the base plate, or welded thereto. To facilitate the exchange of parts, a clamping or screwing of the electrode necks to the base plate may be provided.

In any embodiment, a completely satisfactory cooling of both the electrodes and the furnace outside through the formed intermediate space is essential to better control the operating conditions.

Accordingly, it is an object of the invention to provide an improved electric furnace particularly for electrical arc or resistance melting into a contact electrode arrangement therefor which includes electrodes which extends through a refractory of the housing and terminate at their one ends in the arc and which have opposite ends which extends outwardly from the housing and terminate in a plate arranged exteriorly of the housing so as to form a space between the plate and the housing for cooling the electrodes.

A further object of the invention is to provide an electric furnace which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
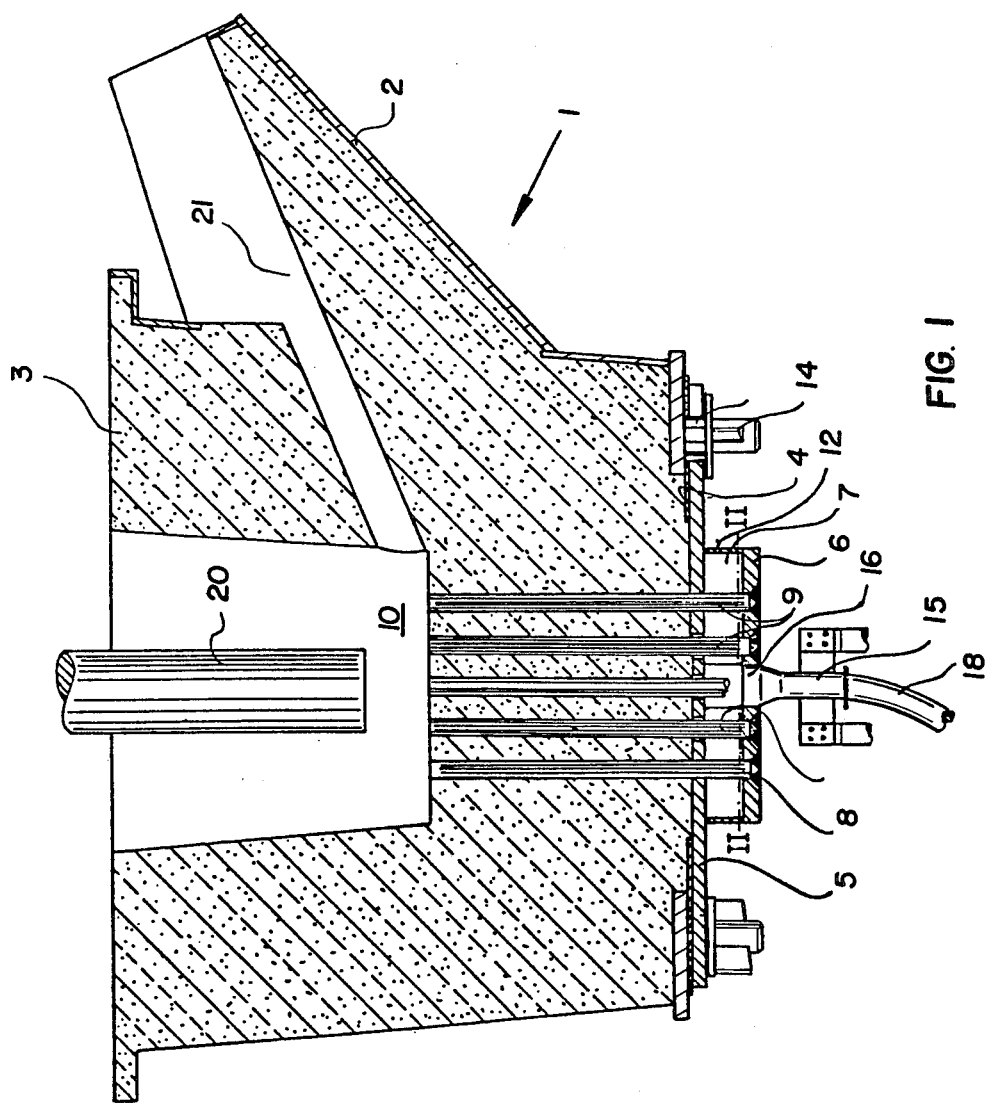
FIG. 1 is a sectional view of a tiltable furnace vessel of an electric arc melting furnace having a contact electrode arrangement constructed in accordance with the invention.

Referring to the drawings in particular, the invention embodied therein in FIG. 1 comprises an electric arc furnace generally designated 1 for arc or resistance melting which comprises a housing or shell 2 having refractory fire brick llining 3 therein which defines a furnace hearth 10 and a chute or sluice 21 connected into the hearth. A plurality of electrodes 9 extend through refractory 3 and one of their ends terminates in the hearth 10 while the opposite ends extend outwardly through a furnace bottom 4 and connect into a base plate 6 located outside of the housing. The base plate 6 comprises plate means which together with side bolts 12 define an exterior cooling space or intermediate space 7 located outside of the housing and surrounding the electrodes at their outer ends. Means are provided to circulate a coolant fluid into the space to cool the electrodes including an air tube 18 connected through a metallic connector 15 and a distributor 16 to the space.

The furnace vessel 1 shown in FIG. 1 comprises a shell 2 and a refractory brickwork forming a lining 3. Below the furnace hearth, i.e. in the zone of the furnace bottom 4, a metallic supporting plate 5 for lining 3 is provided.

Below supporting plate 5 and spaced therefrom, a base plate 6 is provided, so that an intermediate space 7 is formed between bottom 4 and this plate 6. A plurality of electrodes 9 extends by their lower ends or neck portions 8 into base plate 6 and are welded thereto.

Upwardly, the electrodes extend into the furnace lining and terminate in the region of furnace hearth 10. The electrodes are made of a metal, preferably a metal similar or related to that to be melted, for example iron. The electrodes may thus regenerate from the melt at their tips and, in practice, do not wear away.

The number and diameter of electrodes 9 are selected to ensure a satisfactory heat dissipation while preserving an adequate mechanical strength, and also to supply electric current to a sufficiently large portion of the hearth bottom.

The electrodes may be welded to the base plate, as shown. It is also possible, however, to connect them to the base plate by clamping or screwing.

To the supporting plate 5, base plate 6 is connected by means of bolts 12. Supporting plate 5, in turn, is detachably secured to the underside of the furnace vessel by strong bolts 13 and keys 14. It is essential to provide for cooling of the intermediate space 7 between the plates 6 and 4, by means of an air current. The air is supplied through a flexible tube 18 and a metallic connection 15, to enter the space to be cooled through a control inlet 16. By means of air baffles 17, the air is guided to flow with a great efficiency and under equal distribution past the electrode necks 8, thereby cooling both the necks and the bottom side of the furnace. Supply connections 15 serve at the same time as electrical terminals.

Figure 2:
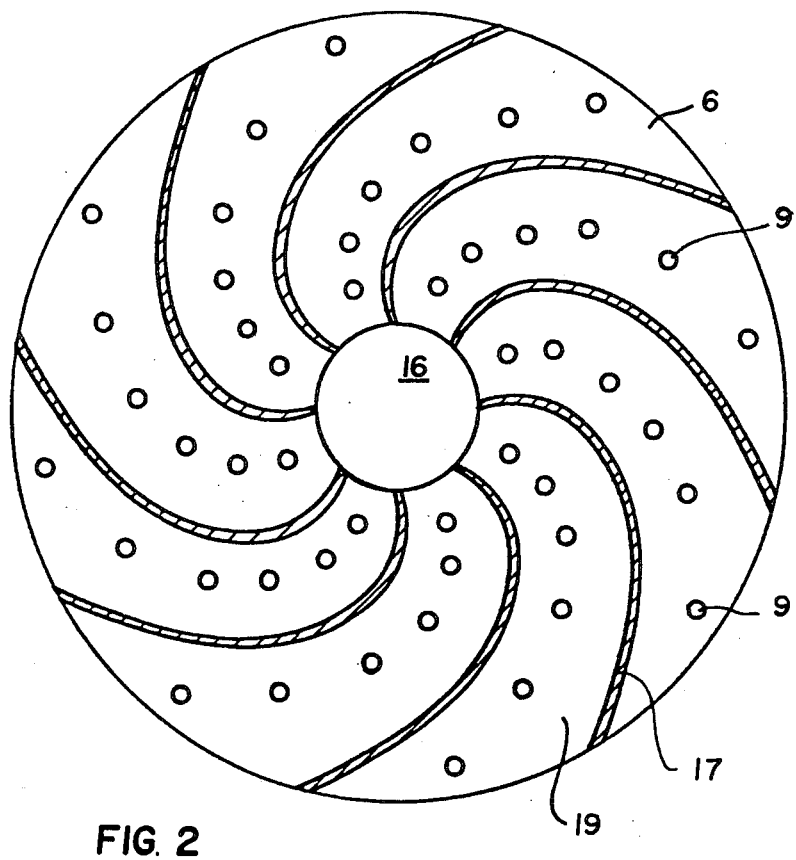
FIG. 2 is a sectional view taken along line II—II of FIG. 1 showing another embodiment of the invention from that shown in FIG. 1.

An arrangement of air baffles 17 is shown in FIG. 2. The central opening 16 is surrounded in star-like fashion by a total of 8 baffles 17 by which the air emerging from inlet 16 is guided. The baffles are curved to shapes of Archimedean spirals, i.e. curves defined by the function $\rho = a \cdot \phi$. Different baffle shapes may be provided to satisfy given conditions. It is also possible to direct the air flow otherwise, if necessary. In the formula for an archimedian spiral given as $\rho = a \cdot \phi$, the symbols are defined as follows:

$\rho$ (rho) is the radius at the end of which the distant point moves $\phi$ (phi) is the angle of rotation.

Unlike in FIG. 1, the arrangement shown in FIG. 2 provides a large number of electrodes 9, namely a total of 40 electrodes, embodied as slender rods or pins. For example, five such electrodes 9 are provided in each channel 19 formed between the air baffles. Slender electrodes mean a favorable ratio of the cross-sectional to the cooled surface areas of the electrodes. The lower limit is given by the mechanical strength and the temporary thermal stresses. Two to forty electrodes may be provided on a base plate, for example. In FIG. 1, for the sake of clarity, only a small number of electrodes is shown.

From FIG. 1, it may further be learned that a movable melting electrode 20 is provided above the electrode arrangement, which projects downwardly deep into the vessel, in a manner known per se. Further provided is a chute which can be brought into a feed position by means of a tilting device (not shown).

Air baffles 17 may be omitted, for example, if a cooling liquid, such as liquid sodium, is supplied into intermediate space 7. Then, base plate 6 will be surrounded on its periphery by a jacket enclosing the intermediate space between the furnace outside and the base plate, in the manner of a low drum.

While specific embodiments of the invention have been shown and described in detail to illustrate the application of the principles of the invention, it will be understood that the invention may be embodied otherwise without departing such principles.

What is claimed is:

1. An electric arc furnace comprising a housing, refractory within said housing defining a furnace hearth in said housing, a plurality of electrodes extending through said refractory into said hearth and having ends extending out of said housing, plate means including a plate spaced away from said housing and connected to the ends of said electrodes and defining a cooling space outside of said housing surrounding said electrodes, means for circulating a cooling fluid into said space to cool the electrodes, and a plurality of air baffles disposed in said cooling space for the directing air in a plurality of paths over said electrodes.

2. An electric arc furnace according to claim 1, wherein said plate means includes a jacket enclosing the intermediate space between said plate and said housing.

3. An electric arc furnace according to claim 1, wherein said base plate is provided with air inlets.

4. An electric arc furnace according to claim 1, wherein said electrode ends which are connected to said plate extend into said plate and are welded thereto.

5. An electric arc furnace according to claim 1, wherein said electrodes are threaded into said base plate.

6. An electric arc furnace, comprising a housing, refractory within said housing defining a furnace hearth in said housing, a plurality of electrodes extending through said refractory into said hearth and having ends extending out of said housing, plate means including a plate spaced away from said housing and connected to the ends of said electrodes and defining a cooling space outside of said housing surrounding said electrodes, means for circulating a cooling fluid into said space to cool the electrodes, said base plate including a central air inlet, and including a plurality of baffles located between said plate and said housing defining a star-like pattern extending around said inlet.

7. An electric arc furnace according to claim 6, including a supply connection connected to said inlet providing means for electrical supply connection to said inlet.

* * * * *